US008587680B2

(12) United States Patent
Okumura et al.

(10) Patent No.: US 8,587,680 B2
(45) Date of Patent: Nov. 19, 2013

(54) COMMUNICATION SYSTEM, TRANSMISSION DEVICE AND RECEPTION DEVICE

(75) Inventors: Fujio Okumura, Tokyo (JP); Osamu Ishibashi, Tokyo (JP); Masao Imai, Tokyo (JP)

(73) Assignee: NEC Corporation, Tokyo (JP)

( * ) Notice: Subject to any disclaimer, the term of this patent is extended or adjusted under 35 U.S.C. 154(b) by 593 days.

(21) Appl. No.: 12/920,392

(22) PCT Filed: Mar. 2, 2009

(86) PCT No.: PCT/JP2009/053809
§ 371 (c)(1),
(2), (4) Date: Aug. 31, 2010

(87) PCT Pub. No.: WO2009/113416
PCT Pub. Date: Sep. 17, 2009

(65) Prior Publication Data
US 2011/0007171 A1    Jan. 13, 2011

(30) Foreign Application Priority Data

Mar. 10, 2008  (JP) .................. 2008-059969

(51) Int. Cl.
*H04N 5/232* (2006.01)
*G06K 9/36* (2006.01)
(52) U.S. Cl.
USPC ...................................... 348/211.4; 345/589
(58) Field of Classification Search
USPC ......... 348/211.1–211.14, 500, 211.99, 207.1;
382/100, 276, 305; 455/502, 39, 73,
455/91, 130, 556.1, 556.2, 414.1; 345/589,
345/581, 624; 725/105
See application file for complete search history.

(56) References Cited

U.S. PATENT DOCUMENTS

| 8,144,164 B2 * | 3/2012 | Watanabe .................. 345/589 |
| 8,213,675 B2 * | 7/2012 | Kim et al. .................. 382/100 |
| 8,223,162 B2 * | 7/2012 | Miyasaka et al. .......... 345/581 |
| 2003/0026449 A1 * | 2/2003 | Yerazunis et al. ........ 382/100 |
| 2003/0118183 A1 * | 6/2003 | Struyk ....................... 380/213 |
| 2003/0133569 A1 * | 7/2003 | Stern et al. ................ 380/206 |
| 2003/0171096 A1 * | 9/2003 | Ilan et al. .................. 455/3.06 |
| 2005/0120381 A1 * | 6/2005 | Yamaguchi ................ 725/105 |
| 2006/0092835 A1 * | 5/2006 | Lee ............................ 370/229 |

(Continued)

FOREIGN PATENT DOCUMENTS

| JP | 63-312788 | 12/1988 |
| JP | 6-118927 | 4/1994 |

(Continued)

OTHER PUBLICATIONS

International Search Report, PCT/JP2009/053809, Jun. 9, 2009.

*Primary Examiner* — Aung S Moe
(74) *Attorney, Agent, or Firm* — Young & Thompson

(57) ABSTRACT

A transmission device displays a public image (a first image) provided to unspecified users, a private image (a second image) provided to particular users, and a mask image of the private image in a time division multiplexed manner, and transmits a private image sync signal synchronized with display of the private image. A reception device receives the private image sync signal transmitted from the transmission device and shoots by a shooting unit the private image displayed on the transmission device by using the private image sync signal, and displays the shot image on a display unit.

14 Claims, 11 Drawing Sheets

(56) References Cited

U.S. PATENT DOCUMENTS

| | | |
|---|---|---|
| 2008/0089552 A1* | 4/2008 | Nakamura et al. ............ 382/100 |
| 2009/0244364 A1* | 10/2009 | Nonogaki .................. 348/438.1 |
| 2009/0262127 A1* | 10/2009 | Miyasaka et al. ............ 345/589 |
| 2010/0020237 A1* | 1/2010 | Miyasaka et al. ............ 348/563 |
| 2010/0097409 A1* | 4/2010 | Miyasaka et al. ............ 345/690 |
| 2010/0177112 A1* | 7/2010 | Miyasaka et al. ............ 345/589 |
| 2010/0317332 A1* | 12/2010 | Bathiche et al. ............. 455/418 |
| 2011/0007160 A1* | 1/2011 | Okumura ..................... 348/143 |
| 2011/0007171 A1* | 1/2011 | Okumura et al. ........... 348/211.4 |
| 2011/0029362 A1* | 2/2011 | Roeding et al. ........... 705/14.13 |
| 2011/0069196 A1* | 3/2011 | Jung et al. .................. 348/222.1 |
| 2011/0222559 A1* | 9/2011 | Ishii et al. ..................... 370/498 |
| 2011/0234629 A1* | 9/2011 | Kim et al. ..................... 345/629 |
| 2012/0188442 A1* | 7/2012 | Kennedy ...................... 348/441 |

FOREIGN PATENT DOCUMENTS

| | | |
|---|---|---|
| JP | 11-184445 | 7/1999 |
| JP | 2006-020204 | 1/2006 |
| JP | 2007-163233 | 6/2007 |
| WO | WO2007/015452 | 2/2007 |
| WO | WO2008/015905 | 2/2008 |

* cited by examiner

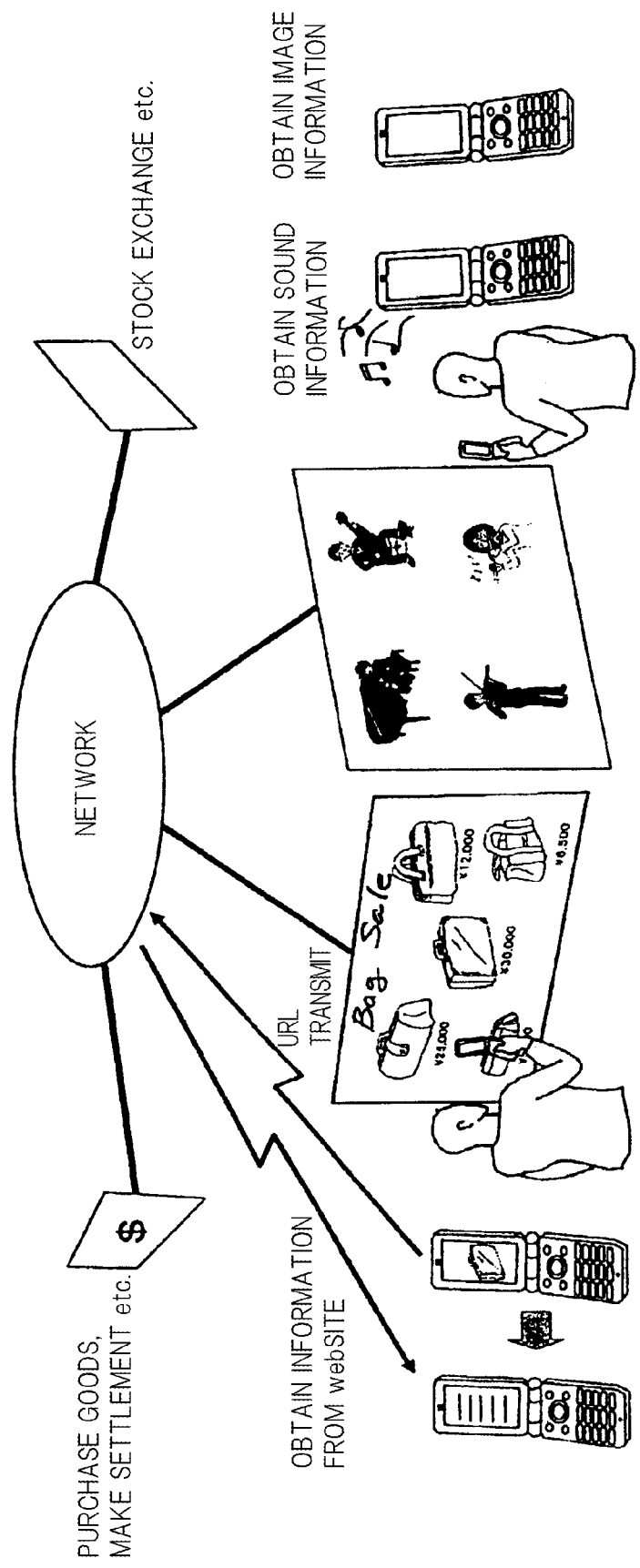

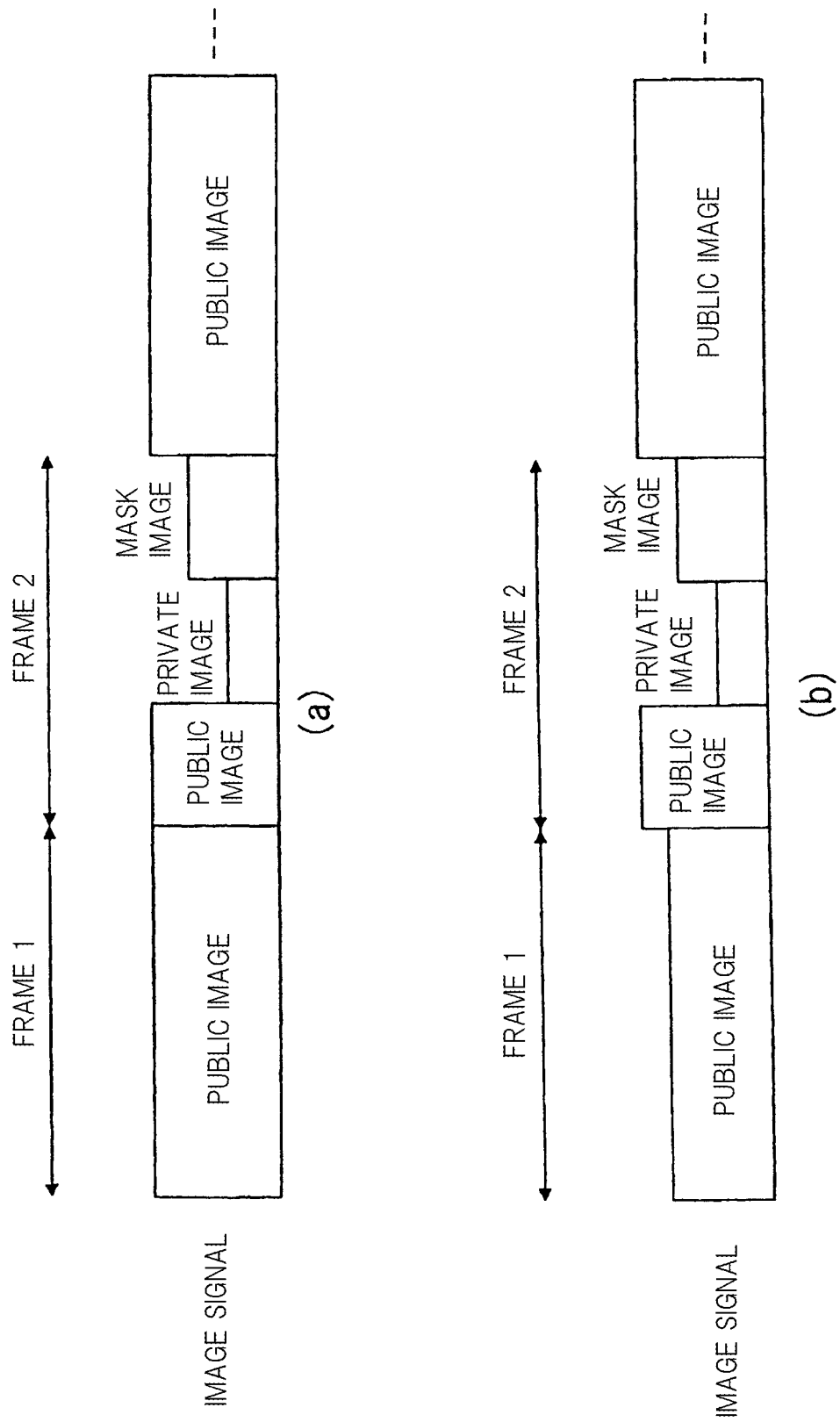

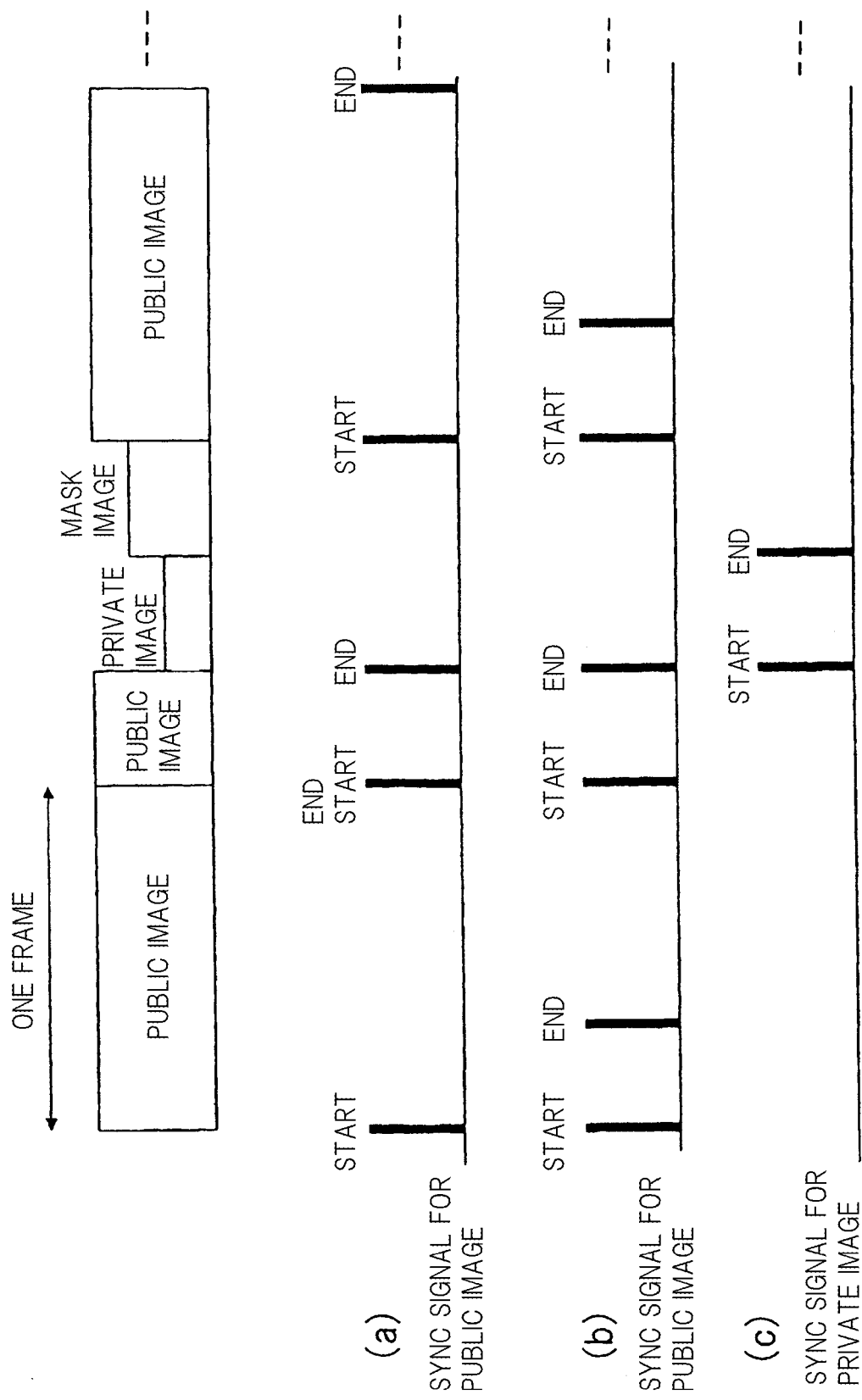

COMMUNICATION SYSTEM, TRANSMISSION DEVICE AND RECEPTION DEVICE

TECHNICAL FIELD

The present invention relates to a communication system for transmitting information by means of an image or a moving image displayed on a display or the like and to a transmission device and a reception device used in the communication system.

BACKGROUND ART

As a visible light communication technique for transmitting information by means of an image or a moving image displayed on a display or the like, a system is known in which a particular two-dimensional code (QR code) or the like is displayed in a portion of a displayed image and an image of the two-dimensional code is taken with a camera such as one in a portable telephone set to receive information.

For example, Japanese Laid-Open Patent Application No. 2007-163233 includes a description of an arrangement for generating malfunction diagnosis data including an abnormality signal indicating an abnormality when the abnormality is detected by a vehicle navigation system, converting the malfunction diagnosis data into a symbol code (such as a bar code or a two-dimensional code) and displaying the symbol code on a display device to enable a user to visually recognize the malfunction diagnosis data by reading the displayed symbol code through a portable terminal device.

Also, Japanese Laid-Open Patent Application No. 2006-020204 includes a description of an arrangement for obtaining various content by reading via a terminal device a two-dimensional code printed on a display medium and by accessing a server unit which provides content such as images and sounds, and which is identified from information in the read two-dimensional code.

Visible light communication techniques such as described above, however, entail a problem in that when a two-dimensional code is displayed, for example, on a large display used on a street, the two-dimensional code occupies a portion of an image (public image) such as an advertisement displayed to the public to impair the appearance of the image.

SUMMARY

Therefore, it is an object of the present invention to provide a communication system capable of performing visible light communication by a simple means without impairing the appearance of a public image, and a transmission device and a reception device used in the communication system.

In order to achieve the above-described object, a communication system of an exemplary aspect of the present invention comprising:

a transmission device which outputs an image signal for displaying a first image, a second image and a mask image of the second image in a time division multiplexed manner, and which transmits a second image sync signal synchronized with display of the second image;

a display device which displays an image on the basis of the image signal output from the transmission device; and a reception device which receives the second image sync signal and shoots via a shooting unit the second image displayed on the transmission device by using the second image sync signal.

On the other hand, a transmission device in the exemplary aspect of the present invention comprising:

a display unit which displays a first image, a second image and a mask image of the second image;

a control unit for displaying the first image, the second image and the mask image on the display unit in a time division multiplexed manner; and a sync signal generation unit which transmits a second image sync signal synchronized with display of the second image.

A reception device in the exemplary aspect of the present invention comprising:

a sync signal processing unit which receives a second image sync signal synchronized with a second image transmitted from a transmission device, and designates timing of shooting of the second image on the basis of the received second image sync signal;

a shooting unit which shoots the second image at a command from the sync signal processing unit; and a display unit which displays the second image shot by the shooting unit.

BRIEF DESCRIPTION OF THE DRAWINGS

FIG. 1B is a schematic diagram showing an example of the configuration of a network system using the communication system shown in FIG. 1A.

FIG. 9 is a diagram showing other examples of the operation of the transmission device in the third exemplary embodiment;

Figure 1A:
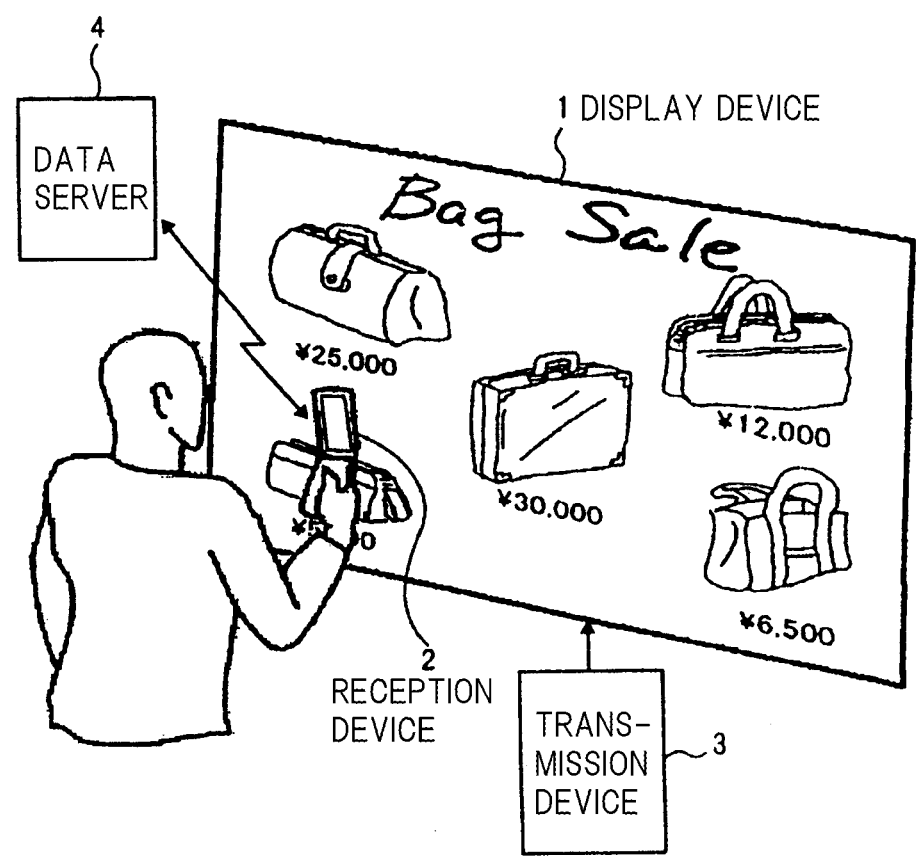
FIG. 1A is a schematic diagram showing an example of the configuration of a communication system in a first exemplary embodiment.

(a) in FIG. 9 is a schematic diagram showing an example of the operation for increasing the facility with which flicker is perceived;

(b) in FIG. 9 is a schematic diagram showing an example of the operation for reducing the facility with which flicker is perceived.

FIG. 10 is a schematic diagram showing an example of the operation of a reception device in a fourth exemplary embodiment.

EXEMPLARY EMBODIMENT

The present invention will be described with reference to the drawings.

As a method for coping with the above-described problem of the related art, there is a secure display technique using a combination of a display device which displays in a time division multiplexed manner, for example, a public image and an image (private image) to be provided only to particular users and an optical shutter made transmissive to light in synchronization with the timing of display of the private image.

In the secure display technique, a public image to be provided to unspecified users through a display device, a private image to be provided only to particular users and a mask image of the private image are displayed in one frame in a time division multiplexed manner and an optical shutter existing before the eyes of a user is changed into a transmissive state in synchronization with the timing of display of the private image. In this way, the user using the optical shutter is enabled to visually recognize only the private image, while surrounding unspecified users not using the optical shutter (the public) visually recognize only the public image since the private image and the mask image of the private image are superimposed on each other to form a halftone (gray) image. The "first image" described in the claims corresponds to the above-described public image, and the "second image" corresponds to the above-described private image.

Use of this secure display technique enables providing various sorts of information to users having the optical shutter by using private images while providing public images to unspecified persons. As a result, impairing the appearance of public images is avoided.

The secure display technique, however, requires the optical shutter for visual recognition of a private image as described above and therefore entails limiting users to which a private image can be provided. In ordinary visible light communication, it is desirable to enable various sorts of information (contents) to be provided more easily to a larger number of users by means of private images.

For example, in a case where an advertisement or the like is displayed by means of a public image or the like and a URL (Uniform Resource Locator) of a server unit which provides details of a commodity displayed in the public image is displayed in the form of a two-dimensional code or the like by means of a private image, enabling acquisition of the two-dimensional code without using any optical shutter is preferable because the users' convenience is improved thereby.

According to the present invention, a method of using this secure display technique to enable various content to be easily provided to a multiplicity of users by means of a private image is proposed. In the following description, as well as in the description of the secure display technique, an image such as an advertisement to be provided to unspecified persons is referred to as "public image", while an image to be provided only to particular users is referred to as "private image".

First Exemplary Embodiment

FIG. 1A is a schematic diagram showing an example of the configuration of a communication system in a first exemplary embodiment. FIG. 1B is a schematic diagram showing an example of the configuration of a network system using the communication system shown in FIG. 1A.

As shown in FIG. 1A, the communication system in the first exemplary embodiment is configured by including display device 1 on which a public image, a private image and a mask image of the private image are displayed in a time division multiplexed manner, transmission device 3 which outputs an image signal for displaying each image on display device 1, reception device 2 which obtains a public image or a private image from an image displayed on display device 1, and which is in the possession of a user, and data server 4 which transmits data on various kinds of contents to reception device 2 by a well-known communication means, and which is placed in the vicinity of display device 1 or transmission device 3.

As shown in FIG. 1A, the user using the communication system in the present exemplary embodiment directs toward an image displayed on display device 1 a camera provided in reception device 2, which camera is not shown in the figure, and shoots a public image displayed on a display unit of reception device 2 while visually recognizing the public image. The image shot at this time may be the entire public image or a portion of the public image. By such an operation, the user can display a public image or a portion of the public image (e.g., a commodity in an advertise display) on reception device 2 and can display on reception device 2 a private image corresponding to the shot position in the public image. Also, the user can obtain through reception device 2 various content provided by using private images. For example, in a case where a private image obtained by reception device 2 is data for access to data server 4 using a two-dimensional code or the like, data on various content can be obtained from data server 4 by transmitting information to data server 4 and by receiving information from data server 4 on the basis of the access data.

It is assumed that in the communication system shown in FIG. 1A various content is provided to the user by using private images. Therefore, the configuration of the communication system shown in FIG. 1A includes data server 4 that transmits data on the various content to reception device 2. However, data server 4 is not necessarily required. Data server 4 may be removed if only private images are provided.

The communication system shown in FIG. 1A may be connected to a network such as the Internet as shown in FIG. 1B to realize a network system for providing various contents and information services to users.

In a case where in such a network system a private image is, for example, data on a URL using a two-dimensional code or the like, a user can obtain the URL by decoding the two-dimensional code by means of reception device 2 and obtain through a network such as the Internet data on various content from a server unit (Web site) designated by the URL.

In a case where a private image is, for example, a moving image, a user can obtain video information such as a video clip by using reception device 2 and can also obtain audio information (including music or the like) displayed by using a two-dimensional code or the like.

Further, if the secrecy of a private image is utilized, various information services for purchase of an article, settlement processing, stock transaction, etc., using on-line operations, can be provided to a user.

Concrete examples of display device 1, transmission device 3 and reception device 2 constituting the communication system shown in FIG. 1A and the network system shown in FIG. 1B will be described with reference to the drawings.

Figure 2:
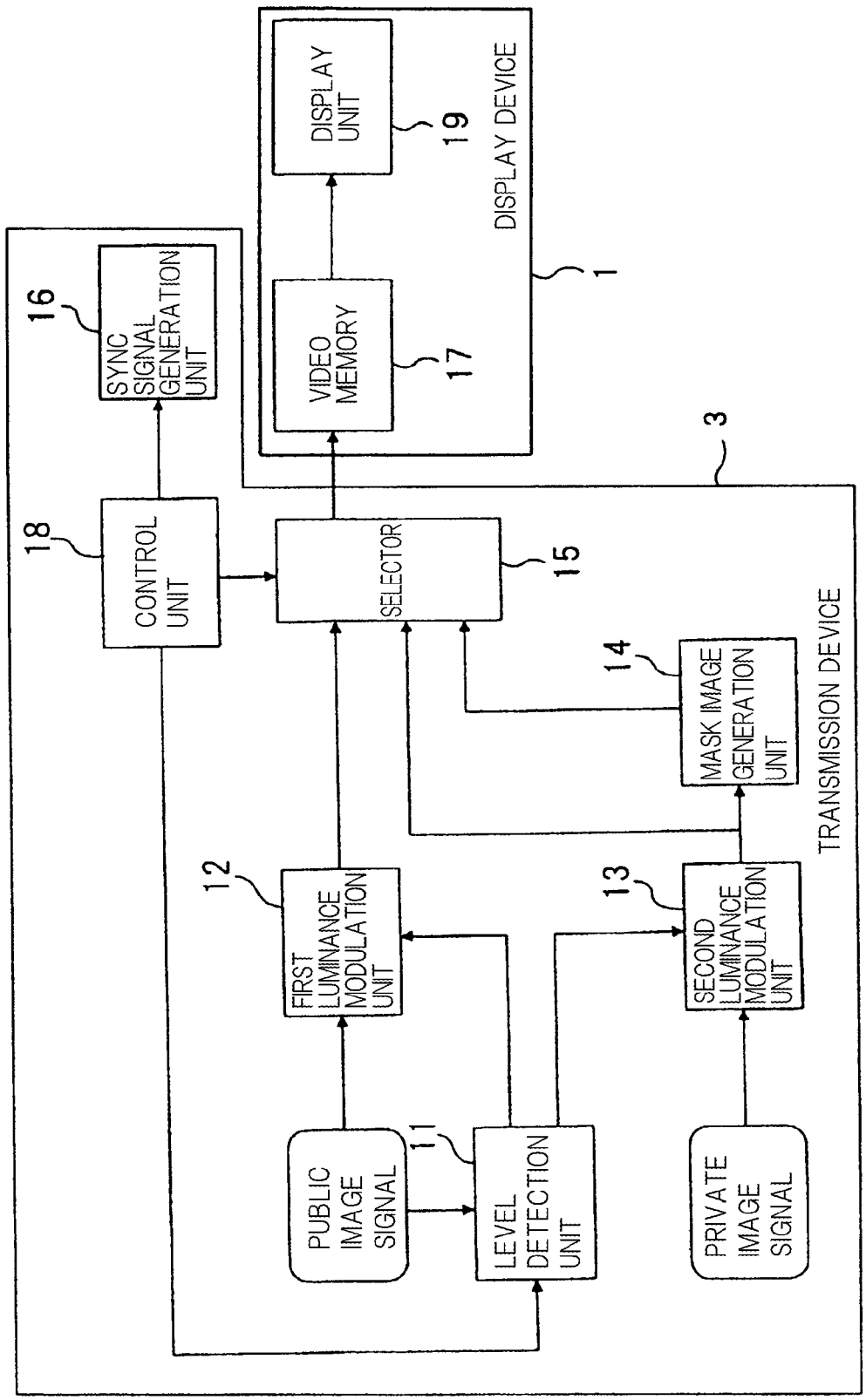
FIG. 2 is a block diagram block diagram showing an example of the configurations of a display device and a transmission device shown in FIG. 1.
Figure 3:
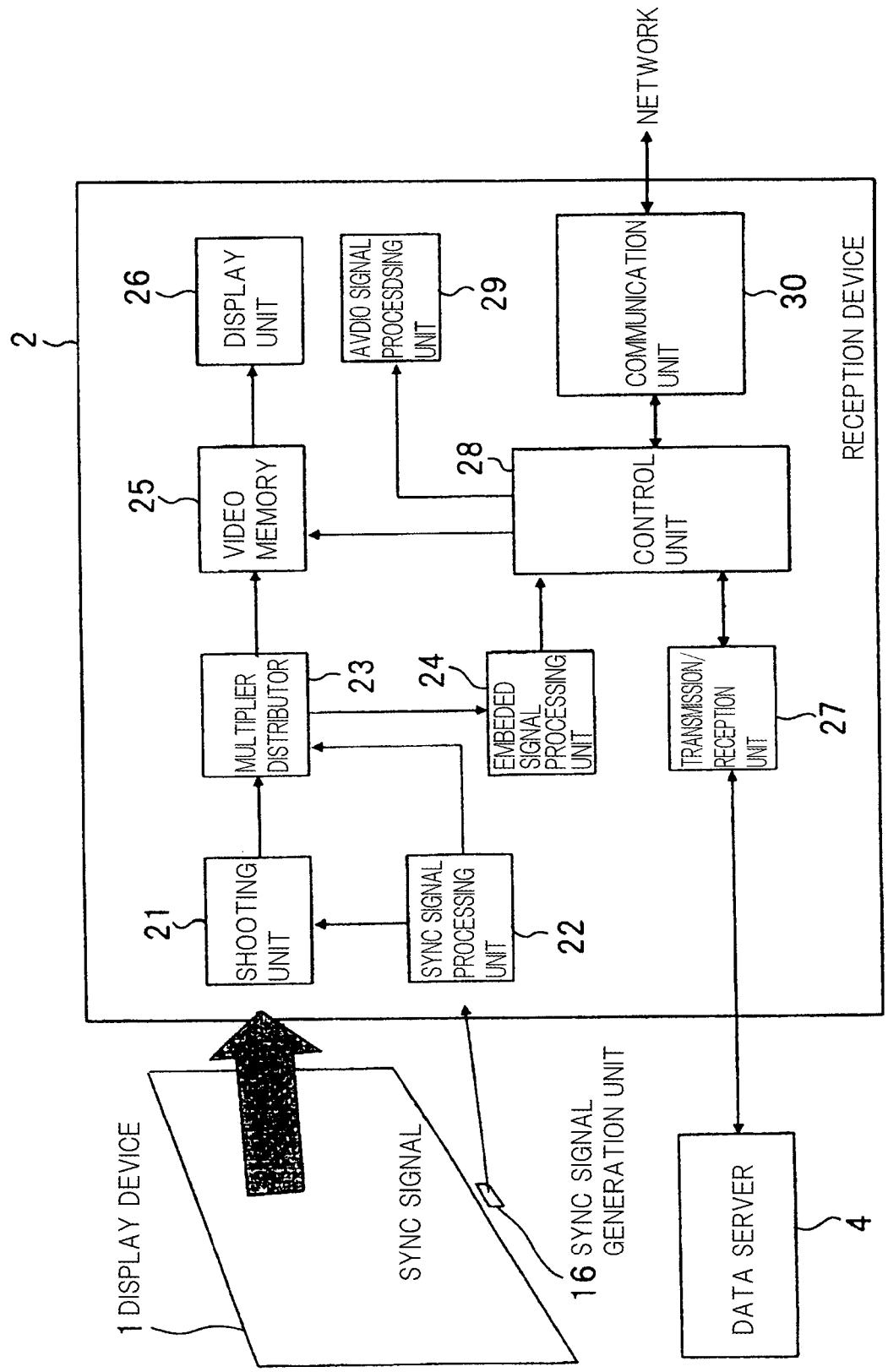
FIG. 3 is a block diagram showing an example of the configuration of a reception device shown in FIG. 1A.

FIG. 2 is a block diagram showing an example of the configurations of the display device and the transmission device shown in FIG. 1A. FIG. 3 is a block diagram showing an example of the configuration of the reception device shown in FIG. 1A.

As shown in FIG. 2, transmission device 3 has level detection unit 11, first luminance modulation unit 12, second luminance modulation unit 13, mask image generation unit 14, selector 15, sync signal generation unit 16 and control unit 18, and display device 1 has video memory 17 and display unit 19.

Level detection unit 11 detects the luminance (image signal level) of a public image and notifies first luminance modulation unit 12 and second luminance modulation unit 13 of the detection result.

First luminance modulation unit 12 changes the luminance (image signal level) of the public image as required on the basis of the detection result from level detection unit 11.

Second luminance modulation unit 13 changes the luminance (image signal level) of a private image as required on the basis of the detection result from level detection unit 11.

Reversed image generation unit 14 generates an image signal corresponding to a reversed image of the private image by using the image signal for the private image after the level has been changed by second luminance modulation unit 13. If the direction of the image signal level of the private image is, for example, the positive direction, an image signal having the image signal level in the negative direction equal in absolute value to that of the private image may be generated as the image signal for the reversed image.

Selector 15 selects from the image signal for the public image output from first luminance modulation unit 12, the image signal for the private image output from second luminance modulation unit 13 and the image signal for the reversed image generated in reversed image generation unit 14 one after another at a command from control unit 18 and successively outputs the image signals to video memory 17.

Sync signal generation unit 16 generates a public image sync signal in synchronization with the start and end of displaying the public image, generates a private image sync signal in synchronization with the start and end of displaying the private image, and transmits these sync signals.

Control unit 18 controls the operations of selector 15 and sync signal generation unit 16 according to the frame construction of the image displayed in display unit 19.

Video memory 17 successively stores as image data the image signals for the public image, private image and reversed image selected by selector 15. Video memory 17 may be provided in transmission device 3 instead of being provided in display device 1.

Display unit 19 successively displays the public image, private image and mask image according to the image data stored in video memory 17.

Transmission device 3 shown in FIG. 2 can be realized with A/D converters for processing image signals and a CPU, a DSP, a logical operation circuit or the like for executing processing in accordance with a program. For display device 1, a liquid crystal display, an LED display, a DLP-type protector device, an organic EL display, a PDP or the like can be used.

As shown in FIG. 3, reception device 2 is configured by including shooting unit 21, sync signal processing unit 22, multiplier distributor 23, embedded signal processing unit 24, video memory 25, display unit 26, transmission/reception unit 27, control unit 28, audio signal processing unit 29 and communication unit 30.

Shooting unit 21 is provided with a camera. Shooting unit 21 shoots an image displayed on display unit 19 of display device 1 at a command from sync signal processing unit 22, and outputs the shot image to multiplier distributor 23.

Sync signal processing unit 22 has reception means for receiving the public image sync signal and the private image sync signal transmitted from transmitter 3, designates timing of shooting of the public image or the private image for shooting unit 21 on the basis of the received public image sync signal and private image sync signal, and outputs the public image sync signal or the private image sync signal to multiplier distributor 23.

The public image sync signal and the private image sync signal are transmitted from sync signal generation unit 16 provided in transmission device 3 to sync signal processing unit 22 provided in reception device 2 by using an optical communication means using infrared rays or the like or a well-known short-distance wireless communication means such as Bluetooth, UWB or ZigBee.

Multiplier distributor 23 changes the luminance (image signal level) of the image signal for the public image or the private image output from image shooting unit 21 and distributes the image signal to video memory 25 and embedded signal processing unit 24.

Video memory 25 stores as image data the image signal output from multiplier distributor 23 or control unit 28.

Display unit 26 displays the public image or the private image according to the image data stored in video memory 25.

Embedded signal processing unit 24 executes required signal processing on the image signal for the private image obtained by shooting unit 21. For example, if the private image shot by shooting unit 21 is a two-dimensional code, embedded signal processing unit 24 decodes the two-dimensional code. The results of signal processing in embedded signal processing unit 24 are output to control unit 28.

Control unit 28 obtains various sorts of content data such as audio (including music or the like) data, character data, image data and moving image data from the network or data server 4 on the basis of the result of signal processing in embedded signal processing unit 24 by using transmission/reception unit 27 and communication unit 30. For example, in a case where a URL is obtained as a result of signal processing in embedded signal processing unit 24, control unit 28 obtains, by using communication unit 30, various sorts of content data from a server unit or the like in the network designated by the URL. In a case where data for access to data server 4 is obtained as a result of signal processing in embedded signal processing unit 24, control unit 28 obtains various sorts of content data from data server 4 by using transmission/reception unit 27. The obtained audio data is output to audio signal processing unit 29, while the character data, image data and moving image data or the like is stored as image data in video memory 25.

Audio signal processing unit 29 has an amplifier which outputs an audio signal and a speaker or the like which outputs sound. Audio signal processing unit 27 converts the audio data supplied from control unit 28 into an audio signal and outputs sound through the speaker.

Transmission/reception unit 27 is communicably connected to data server 4 and receives various sorts of content data from data server 4 at a command from control unit 28. Transmission/reception unit 27 and data server 4 may transmit and receive various sorts of content data by using an optical communication means using infrared rays or the like or a well-known short-distance wireless communication means such as Bluetooth, UWB or ZigBee.

Communication unit 30 is communicably connected to a network such as the Internet by a well-known wireless communication means and receives at a command from control unit 28 various sorts of content data from a server unit or the like in the network designated by a URL.

As reception device 2, a portable terminal device such as a portable telephone, a PDA (personal digital assistant) or a notebook-type personal computer having a camera for shooting images and a reception device which receives the public image sync signal and the private image sync signal transmitted from transmission device 3 is used.

The operation of transmission device 3 in the first exemplary embodiment will next be described with reference to the drawings.

Figure 4:
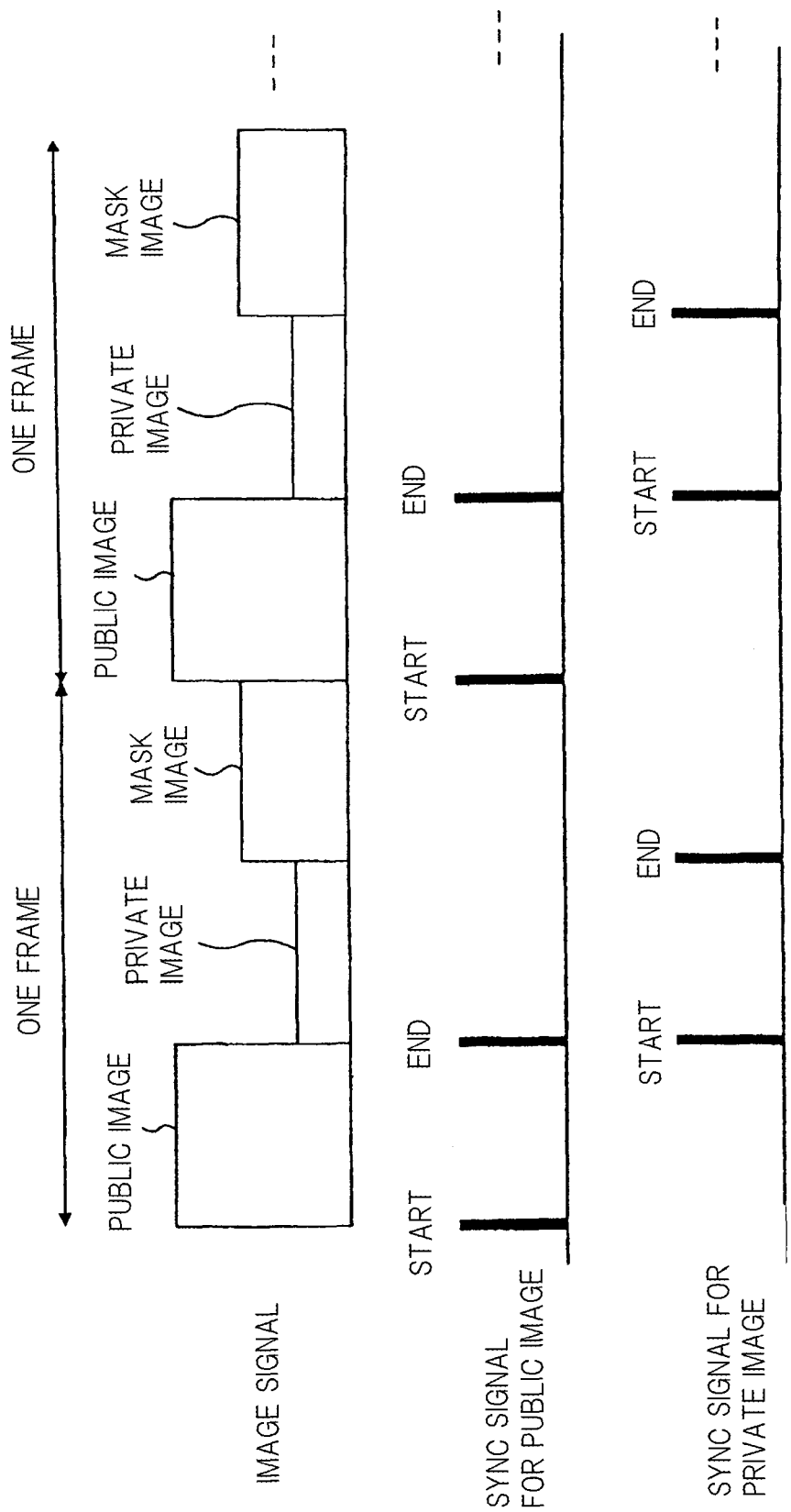
FIG. 4 is a schematic diagram showing an example of the operation of the transmission device in the first exemplary embodiment.

FIG. 4 is a schematic diagram showing an example of the operation of the transmission device in the first exemplary embodiment.

As shown in FIG. 4, transmission device 3 in the first exemplary embodiment displays a public image, a private image and a mask image in one frame in a time division multiplexed manner, as in the above-described secure display technique. The public image, private image and mask image may be displayed in any order in one frame. Sync signal generation unit 16 transmits the public image sync signal in synchronization with the start and end of displaying the public image and the private image sync signal in synchronization with the start and end of displaying the private image.

Reception device 2 receives the public image sync signal and the private image sync signal by sync signal processing unit 22, shoots the public image or the private image by shooting unit 21 at a position designated by an operation performed by a user, and displays the shot image on display unit 26. It is not necessarily required that the private image be displayed on display unit 26. The results of signal processing in embedded signal processing unit 24 and various sorts of content data obtained from the network or data server 4 on the basis of the results of signal processing may be displayed in place of the private image. In such a case, reception device 2 may display the results of signal processing in embedded signal processing unit 24 and various sorts of content data obtained from the network or data server 4 after displaying the private image on display unit 26 only for a time period long enough for the user to check the private image.

In most cases, an image pickup device such as a CCD (charge coupled device) or a CMOS is used as a camera provided in a portable terminal device used as reception device 2. Shooting unit 21 using such an image pickup device ordinarily operates in an accumulation mode in which charges generated in the CCD or CMOS according to amounts of received light are integrated for a certain time period (e.g., the time period corresponding to one frame) in order to reduce noise and improve the photodetection sensitivity. Therefore, shooting unit 21 outputs an image formed by combining the public image and the private image unless the time period during which the public image or the private image is displayed is detected by a certain means.

Reception device 2 in the present exemplary embodiment detects the beginning and end of the integration period at the time of shooting of the required public image or private image by using the public image sync signal and the private image sync signal transmitted from transmission device 3. Therefore reception device 2 can shoot the public image and the private image without combining the public image and the private image by shooting unit 21 at a position designated by a user operation. Also, since reception device 2 in the present exemplary embodiment shoots the private image by using the private image sync signal, deterioration in image quality, i.e., deterioration in the signal level used for visible light communication, due to combining of the public image and the private image is prevented.

The communication system in the first exemplary embodiment enables visible light communication by a simple means without impairing the appearance of a public image.

Figure 5:
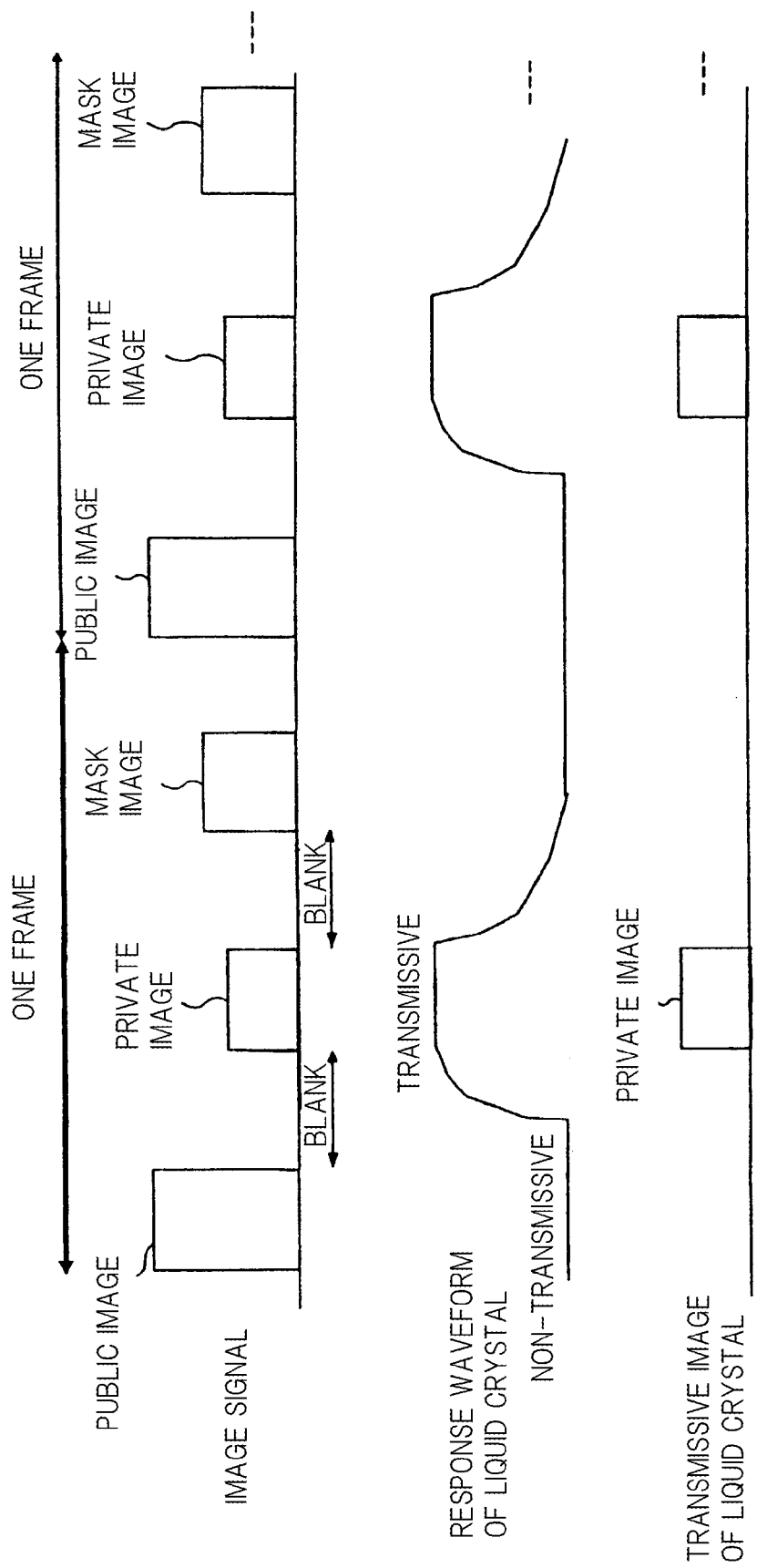
FIG. 5 is a schematic diagram showing an example of the operation of a transmission device and an optical shutter used in a secure display technique.

In the above-described secure display technique, there is a need to provide between a public image, a private image and a mask image of the private image a time period (blank) in which no image is displayed, as shown in FIG. 5, because a liquid crystal is used as an optical shutter. This blank is provided for the purpose of reliably transmitting only the private image while excluding the public image or the mask image displayed before or after the private image, because a certain time period is required for changing the liquid crystal from the non-transmissive state to the transmissive state or from the transmissive state to the non-transmissive state. Thus, the above-described secure display technique entails the problem of a reduction in the luminance of the private image.

On the other hand, in the communication system in the present exemplary embodiment, shooting unit 21 provided in reception device 2 shoots a public image or a private image and the shot image is displayed and there is, therefore, no need to provide a blank period between the public image and the private image or between the private image and the mask image as shown in FIG. 4. As a result, the reduction in luminance of a private image is suppressed in comparison with the above-described secure display technique.

Second Exemplary Embodiment

Figure 6:
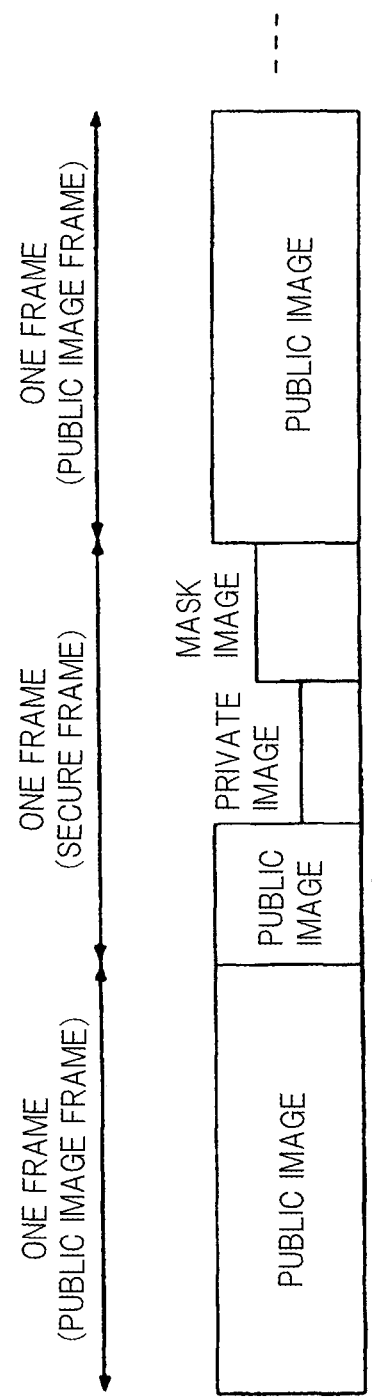
FIG. 6 is a schematic diagram showing an example of the operation of a transmission device in a second exemplary embodiment.

FIG. 6 is a schematic diagram showing an example of the operation of a transmission device in a second exemplary embodiment.

Transmission device 2 in the second exemplary embodiment sets the time period during which a public image is displayed to be longer than the time period during which a private image and a mask image are displayed. More specifically, as shown in FIG. 6, a frame in which only a public image is displayed (hereinafter referred to as "public image frame") is provided and a frame in which a public image, a private image and a mask image are displayed in a time division multiplexed manner as described in the first exemplary embodiment (hereinafter referred to as "secure frame") is periodically inserted between a plurality of consecutive public image frames. If, as described above, the time period during which a public image is displayed is set longer than the time period during which a private image and a mask image are displayed, the luminance of the public image displayed on display device 1 is increased to improve the contrast. As a result, the image quality of the displayed public image is improved.

For frame change between the public image frame and the secure frame, control unit 18 in transmission device 3 may make selector 15 select the suitable image signal according to the frame construction. Also, sync signal generation unit 16 in transmission device 3 may transmit the public image sync signal in synchronization with the start and end of displaying a public image and the private image sync signal in synchronization with the start and end of displaying a private image according to the frame construction of an image displayed on display device 1. The configurations of display device 1, transmission device 3 and reception device 2 and other details of the operations are the same as those in the first exemplary embodiment, and a description for them will not be repeated.

In the above-described secure display technique, a private image is supposed to be visually recognized directly by a user and there is, therefore, a possibility of the luminance of a private image being so low that a luminance practically sufficient for visible light communication cannot be obtained in a case where public image frames are simply provided when visible light communication is performed. In the present invention, however, a private image is directly shot by shooting unit 21 of reception device 2 without passing through an optical shutter, stored in video memory 25 and displayed. As a result, the need to consider of a reduction in luminance of a private image such as in the case of the secure display technique is eliminated.

Figure 7:
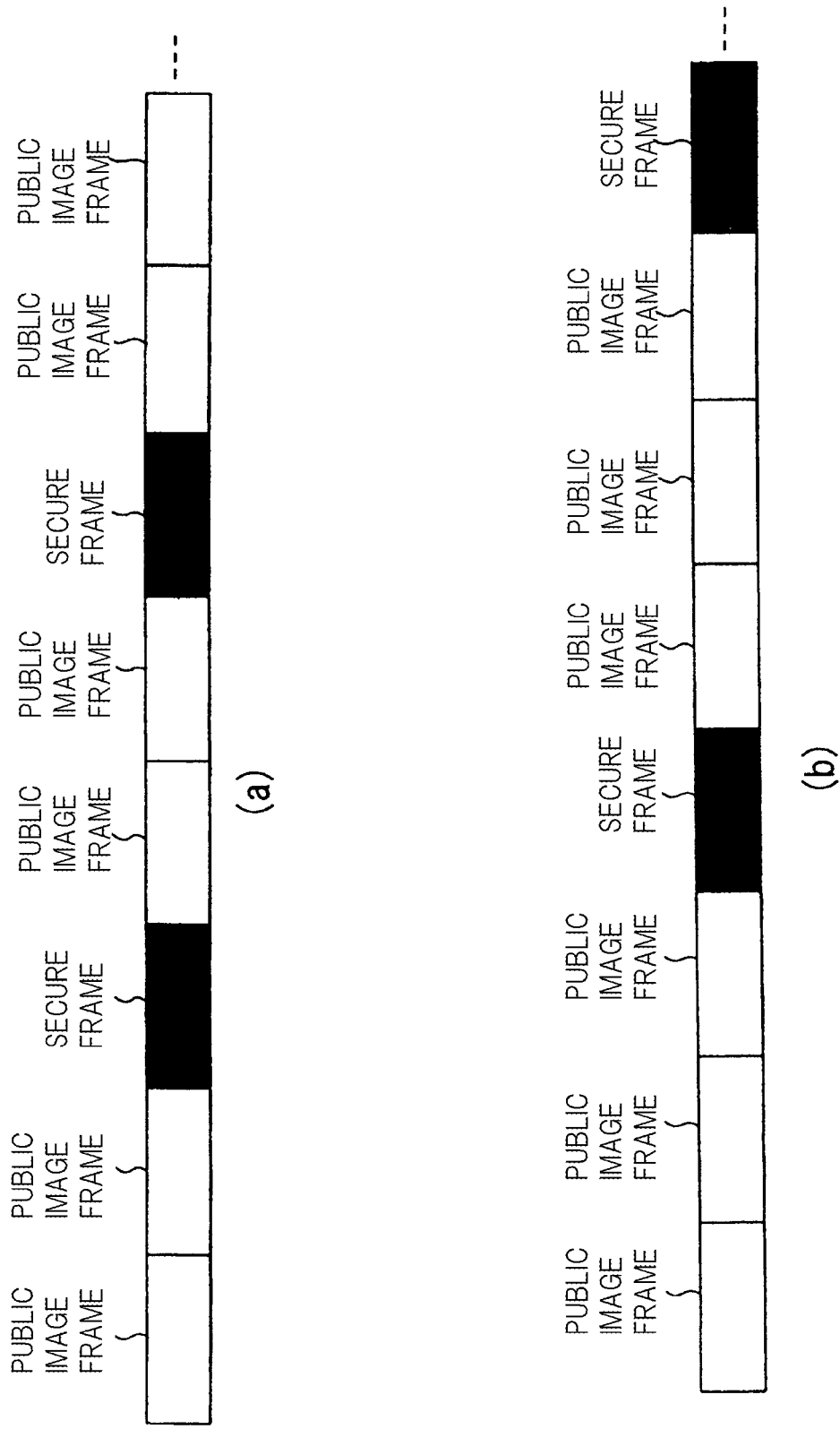
FIG. 7 is a schematic diagram showing another example of the operation of the transmission device in the second exemplary embodiment.

The frame construction may alternatively be such that one secure frame is provided in every three frames as shown in FIG. 7(a), in every four frames as shown in FIG. 7(b), or in every five or six frames. If the number of public image frames is increased, the luminance of a public image is increased to improve the contrast of the public image. However, an increase in the number of public image frames means a reduction in the chance of obtaining a private image. In a case where the frequency with which a private image is updated is high (in the case of display of a moving image or the like) or in a case where there is a need to shorten the time taken to display a private image on reception device 2, therefore, it is preferable to set a limit to the increase in number of public image frame as desired.

The present exemplary embodiment has, in addition to the same advantages as those of the first exemplary embodiment, the advantage of increasing the luminance of a public image displayed on display device 1 to improve the contrast, whereby the image quality of a displayed public image can be improved.

Third Exemplary Embodiment

Figure 8:
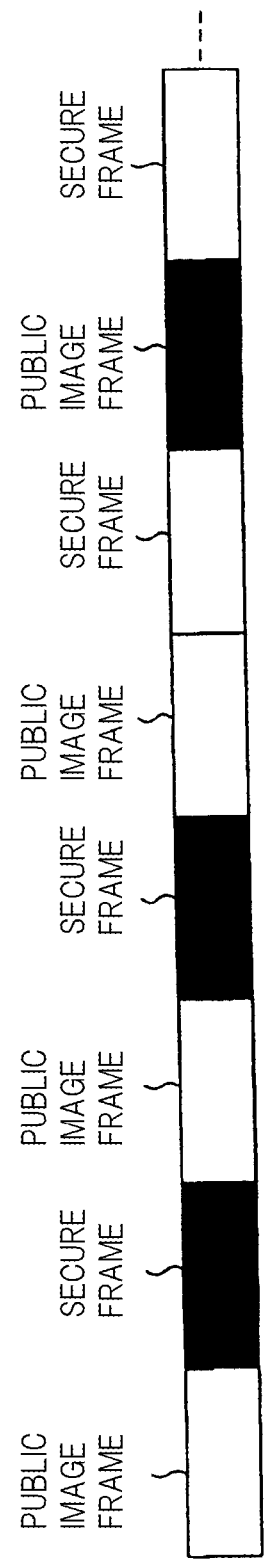
FIG. 8 is a schematic diagram showing an example of the operation of a transmission device in a third exemplary embodiment.

FIG. 8 is a schematic diagram showing an example of the operation of a transmission device in a third exemplary embodiment. FIG. 9 is a diagram showing other examples of the operation of the transmission device in the third exemplary embodiment; (a) in FIG. 9 is a schematic diagram showing an example of the operation for increasing the facility with which flicker is perceived; and (b) in FIG. 9(b) is a schematic diagram showing an example of the operation for reducing the facility with which flicker is perceived. The configurations of display device 1, transmission device 3 and reception device 2 and other details of the operations are the same as those in the first and second exemplary embodiments, and a description for them will not be repeated.

In the above-described second exemplary embodiment, an example of periodically inserting a secure frame in every group of certain number of consecutive frames has been described. However, the luminance of a public image varies due to the difference between the display period for a public image frame and the display period for a secure frame. Therefore, periodic insertion of a secure frame in an image displayed on display device 1 can cause the generation of flicker of a public image.

In the third exemplary embodiment, a secure frame is randomly inserted in a plurality of consecutive public image frames (see FIG. 8). By doing so, flicker in a public image displayed on display device 1 is suppressed.

For frame change between the public image frame and the secure frame, control unit 18 in transmission device 3 may make the selector 15 select the suitable image signal according to the frame construction, as does that in the second exemplary embodiment. Also, sync signal generation unit 16 in transmission device 3 may transmit the public image sync signal in synchronization with the start and end of displaying a public image and the private image sync signal in synchronization with the start and end of displaying a private image according to the displayed frame construction. The configurations of display device 1, transmission device 3 and reception device 2 and other details of the operations are the same as those in the first exemplary embodiment, and a description for them will not be repeated.

A method described below is also effective as a method of suppressing flicker in a public image displayed on display device 1.

In a case where a public image frame (frame 1) and a secure frame (frame 2) exist mixedly as shown in FIG. 9(a), if the image signal levels of the public image in the public image frame and the secure frame are equalized, the difference between the luminances of the public image in these frames is so large that flicker is easily perceived.

Then, as shown in FIG. 9(b), the image signal levels of the public image in the public image frame and the secure frame are changed to make the luminance of the public image between the frames uniform. More specifically, the image signal level of the public image in the public image frame is reduced by first luminance modulation unit 12 according to the ratio of the display periods for the public image frame and the secure frame. Alternatively, the image signal level of the public image in the secure frame is increased by second luminance modulation unit 13 according to the ratio of the display periods for the public image frame and the secure frame. For example, if the display period for the public image frame is three times the display period for the secure frame, first luminance modulation unit 12 sets the image signal level in the public image frame to ⅓ or second luminance modulation unit 13 sets the image signal level in the private image frame three times higher. By each of these methods, flicker in the public image displayed on display device 1 is also suppressed.

Making the luminance of the public image between the public image frame and the secure frame in the above description uniform corresponds to equalizing the peak values of the image signal level of the public image in the frames, to equalizing the averages of the image signal level of the public image in the frames or to processing defined as a combination of these processings.

The present exemplary embodiment has, in addition to the same advantages as those of the first and second exemplary embodiments, the advantage of suppressing flicker in a public image displayed on display device 1.

Fourth Exemplary Embodiment

In a fourth exemplary embodiment, a method for equalizing the luminances of a public image and a private image displayed on display unit 26 in reception device 2 is proposed. The configurations of display device 1, transmission device 3 and reception device 2 are the same as those in the first exemplary embodiment, and a description for them will not be repeated.

FIG. 10 is a schematic sectional view showing an example of the operation of the reception device in the fourth exemplary embodiment.

In a case where a public image frame and a secure frame are mixedly displayed on display device 1 as shown in FIG. 10(a), a public image and a private image differing in lightness (luminance) due to the difference between the integration periods are obtained on reception device 2 when the public image sync signal corresponding to the time at which display of the public image is started and the time at which display of the public image is stopped is transmitted from sync signal generation unit 16 in transmission device 3. Therefore, when the image displayed on the display unit 26 of reception device 2 is changed from the public image to the private image, the frame of the private image is perceived as a dark low-contrast image.

Reception device 2 in the fourth exemplary embodiment increases, by means of multiplier distributor 23, the image signal level of the private image obtained by shooting unit 21 according to the ratio of the display periods for the public image and the private image so that the luminances of the public image and the private image displayed on display unit 26 of reception device 2 are equal to each other, or reduces the image signal level of the private image obtained by shooting unit 21 so that the luminances of the public image and the private image displayed on display unit 26 of reception device 2 are equal to each other. For example, when it is detected on the basis of the public image sync signal and the private image sync signal that the display period for the public image is three times the display period for the private image, multiplier distributor 23 sets the image signal level of the private image three time higher. Alternatively, multiplier distributor 23 reduces the image signal level of the public image to ⅓. The luminances of the public image and the private images are equalized in this way, thereby displaying the public image and the private image at equal lightnesses on display unit 26 of reception device 2.

There is another method of equalizing the luminances of the public image and the private image displayed on display unit 26 of reception device 2 as described below.

To equalize the luminances of the public image and the private image, the time period from the start of displaying the image to the end of displaying the image in the public image sync signal generated by sync signal generation unit 16 of transmission device 3 may be set so as to coincide with the display period for the secrete image (see FIG. 10(c)). For example, if the display period for the public image in display device 1 is three times the display period for the private image, the time period from the start of displaying the image to the end of displaying the image in the public image sync signal generated by the sync signal generation unit 16 is set to ⅓ of the actual display period.

The integration periods for the public image and the private image in shooting unit 21 of the reception device 2 are equalized in this way, thereby displaying the public image and the private image at equal lightnesses on display unit 26 of reception device 2.

The present exemplary embodiment has, in addition to the same advantages as those of the first exemplary embodiment, the advantage of displaying a public image and a private image at equal lightnesses on display unit 26 of reception device 2.

Equalizing the luminances of a public image and a private image in the above description corresponds to equalizing the peak values of the image signal levels of the public image and the private image, to equalizing the averages of the image signal levels of the public image and the private image or to processing defined as a combination of these processings.

Fifth Exemplary Embodiment

As described above, the secure display technique is used in the present invention. Accordingly, display device 1 displays a public image and a halftone (gray) image formed by superimposing a private image and a mask image of the private image. Therefore, if a dark (black) image is included in a public image, an insufficient black level occurs such that the dark image portion is sensed as lighter than the actual darkness. That is, the contrast of the public image displayed on display device 1 is reduced.

In the fifth exemplary embodiment, if a dark portion exists in a public image displayed on display device 1, transmission device 3 determines a principal color of the portion and makes display device 1 display in secure frames a private image in a blue color or a red color corresponding to the determined color. For example, if the dark portion in the public image has an essentially bluish color, transmission device 3 makes display device 1 display a blue private image and a mask image of the blue private image in the corresponding portion in the secure frames. The halftone obtained by superimposing the private image and the mask image is thereby made blue in the corresponding portion, thus suppressing the reduction in contrast in the dark portion in the public image.

If the dark portion in the public image has an essentially reddish color, transmission device 3 makes display device 1 display a red private image and a mask image of the red private image in the corresponding portion in the secure frames. The halftone obtained by superimposing the private image and the mask image is thereby made red in the corresponding portion, thus suppressing the reduction in contrast in the dark portion in the public image.

Further, in a case where a plurality of dark portions: portions in which an image having an essentially reddish color is displayed and portions in which an image having an essentially bluish color exist in a public image, display device 1 is made to display a red or blue private image and a mask image of the red or blue private image in each corresponding portion in the secure frames. The halftone obtained by superimposing the private image and the mask image is thereby made red or blue in the corresponding portion, thus suppressing the reduction in contrast in the dark portions in the public image.

However, if an ordinary color image is displayed as a private image in the present exemplary embodiment, the color of the private image is not correctly displayed. Therefore, it is preferable that a private image to be displayed in the present exemplary embodiment be a coded image such as a two-dimensional code or a one-dimensional code. However, private images displayed in the present exemplary embodiment are not limited to coded images. Any private image may be displayed if it does not induce a feeling of strangeness even in a case where it includes a red or blue portion as a result of the above-described processing.

In a light portion of a public image, a private image formed of an ordinary color image and a mask image of the private image are displayed within secure frames in the same manner as described in any of the first to third exemplary embodiments.

In a case where a private image and a mask image are displayed in blue or red, blue or red is more strongly displayed in a public image. Therefore, the image signal level of blue or red in the public image may be reduced according to the image signal level of the halftone formed by superimposing the private image and the mask image to enable the whole of the private image and the mask image to be displayed as a blue or red image.

Transmission device 3 in the fifth exemplary embodiment detects, by means of level detection unit 11 shown in FIG. 2, the image signal level and a color of a public image with respect to each of regions of a predetermined size set in advance, and notifies first luminance modulation unit 12 and second luminance modulation unit 13 of the detection results. First luminance modulation unit 12 reduces the image signal level of blue or red in the public image as desired on the basis of the detection results from level detection unit 11 and outputs the reduced image signal level.

Second luminance modulation unit 13 converts each of regions of a private image having a predetermined size set in advance or the entire private image into a blue or red image on the basis of the detection results from level detection unit 11, and outputs the image. Other details of the configuration of transmission device 3 and the configurations of display device 1 and reception device 2 are the same as those in the first exemplary embodiment, and the description for them will not be repeated.

The present exemplary embodiment has, in addition to the same advantages as those of the first exemplary embodiment, the advantage of suppressing a reduction in contrast and improving the image quality even in a case where a dark portion is included in a public image displayed on display device 1.

The invention in the present application has been described with reference to the exemplary embodiments thereof. However, the invention in the present application is not limited to the above-described exemplary embodiments. Various changes understandable by those skilled in the art can be made in the configuration and details of the invention in the present application within the scope of the invention in the present application.

This application claims the priority based on Japanese Patent Application No. 2008-059969 filed Mar. 10, 2008, the disclosure of which is incorporated herein by reference in its entirety.

The invention claimed is:

1. A communication system comprising:
a transmission device which outputs an image signal for displaying a first image, a second image and a mask image of the second image in a time division multiplexed manner, and which transmits a second image sync signal synchronized with display of the second image;
a display device which displays an image on the basis of the image signal output from the transmission device; and
a reception device which receives the second image sync signal and shoots by a shooting unit the second image displayed on the transmission device by using the second image sync signal.

2. The communication system according to claim 1, wherein the transmission device transmits a first image sync signal synchronized with display of the first image, and the reception device receives the first image sync signal and shoots by the shooting unit the first image displayed on the display unit by using the first image sync signal.

3. The communication system according to claim 1, wherein the transmission device sets a display period for the first image that is longer than a display period for the second image and the mask image.

4. The communication system according to claim 3, wherein the transmission device displays the first image, the second image and the mask image by using a first image frame in which only the first image is displayed and a second frame in which the first image, the second image and the mask image are displayed in a time division multiplexed manner.

5. The communication system according to claim 4, wherein the transmission device randomly inserts the second image frame between a plurality of the consecutive first image frames.

6. The communication system according to claim 4, wherein the transmission device changes the image signal level of the first image in the first image frame or the image signal level of the first image contained in the second image frame according to the ratio of the display periods for the first image contained in the first image frame and the second image frame so that the luminance of the first image in the first image frame and the luminance of the first image contained in the second image frame are equal to each other.

7. The communication system according to claim 1, wherein the transmission device displays a blue or red image while including the blue or red image in the second image and the mask image in a case where the second image is a coded image.

8. A transmission device comprising:
a display unit which displays a first image, a second image and a mask image of the second image;
a control unit for displaying the first image, the second image and the mask image on the display unit in a time division multiplexed manner; and
a sync signal generation unit which transmits a second image sync signal synchronized with display of the second image,
wherein the control unit sets a display period for the first image that is longer than a display period for the second image and the mask image, and
wherein the control unit makes the display unit display the first image, the second image and the mask image by using a first image frame in which only the first image is displayed and a second frame in which the first image, the second image and the mask image are displayed in a time division multiplexed manner.

9. The transmission device according to claim 8, wherein the control unit randomly inserts the second image frame between a plurality of the consecutive first image frames.

10. The transmission device according to claim 8, further comprising:
a level detection unit which detects the luminance of the first image in the first image frame and the luminance of the first image contained in the second image frame; and
a first luminance modulation unit which changes the image signal level of the first image in the first image frame or the image signal level of the first image contained in the second image frame according to the ratio of the display periods for the first image contained in the first image frame and the second image frame so that the luminance of the first image in the first image frame and the luminance of the first image contained in the second image frame are equal to each other.

11. The transmission device according to claim 10, further comprising a second luminance modulation unit for including a blue or red image in the second image or the mask image in a case where the second image is a coded image.

12. The transmission device according to claim 8, wherein the sync signal generation unit transmits a first image sync signal synchronized with display of the first image.

13. A reception device, comprising:
a sync signal processing unit which receives a second image sync signal synchronized with a second image transmitted from a transmission device, and designates timing of shooting the second image on the basis of the received second image sync signal;
a shooting unit which shoots the second image at a command from the sync signal processing unit; and
a display unit which displays the second image shot by the shooting unit,
wherein the sync signal processing unit receives a first image sync signal synchronized with a first image transmitted from the transmission device, and designates the shooting unit timing of shooting the first image on the basis of the received first image sync signal;
the shooting unit shoots the first image at a command from the sync signal processing unit; and
the display unit displays at least the first image shot by the shooting unit.

14. The reception device according to claim 13, further comprising a multiplier distributor unit which, when the transmission device displays the first image, the second image and a mask image of the second image by using a first image frame in which only the first image is displayed and a second frame in which the first image, the second image and the mask image are displayed in a time division multiplexed manner, changes the image signal level of the first image shot by the shooting unit or the image signal level of the second image shot by the shooting unit so that the luminance of the first image and the luminance of the second image are equal to each other.

* * * * *

UNITED STATES PATENT AND TRADEMARK OFFICE
CERTIFICATE OF CORRECTION

PATENT NO.       : 8,587,680 B2                                          Page 1 of 1
APPLICATION NO.  : 12/920392
DATED            : November 19, 2013
INVENTOR(S)      : Okumura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 595 days.

Signed and Sealed this
Twenty-second Day of September, 2015

Michelle K. Lee
*Director of the United States Patent and Trademark Office*